United States Patent
Komatsubara

(10) Patent No.: US 11,240,398 B2
(45) Date of Patent: Feb. 1, 2022

(54) COMMUNICATION PRIORITY OF IMAGE FORMING APPARATUS AND NON-TRANSITORY COMPUTER READABLE MEDIUM STORING PROGRAM

(71) Applicant: FUJIFILM Business Innovation Corp., Tokyo (JP)

(72) Inventor: Keisuke Komatsubara, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 204 days.

(21) Appl. No.: 16/354,221

(22) Filed: Mar. 15, 2019

(65) Prior Publication Data

US 2019/0356812 A1 Nov. 21, 2019

(30) Foreign Application Priority Data

May 15, 2018 (JP) .............................. JP2018-093849

(51) Int. Cl.
 *H04N 1/327* (2006.01)
 *H04N 1/333* (2006.01)
(52) U.S. Cl.
 CPC ....... *H04N 1/3275* (2013.01); *H04N 1/32793* (2013.01); *H04N 1/32797* (2013.01); *H04N 1/33376* (2013.01)
(58) Field of Classification Search
 None
 See application file for complete search history.

(56) References Cited

U.S. PATENT DOCUMENTS

| 2001/0040873 | A1* | 11/2001 | Nakagawa | H04L 45/22 370/252 |
| 2007/0280338 | A1* | 12/2007 | Haub | H04L 27/362 375/222 |
| 2012/0092714 | A1* | 4/2012 | Suzuki | G06F 3/1212 358/1.15 |
| 2014/0204753 | A1* | 7/2014 | Akita | H04W 72/048 370/235 |
| 2015/0324149 | A1* | 11/2015 | Murayama | G06F 3/1234 358/1.13 |
| 2016/0253135 | A1* | 9/2016 | Kubota | H04W 40/246 358/1.15 |
| 2018/0027144 | A1* | 1/2018 | Yokoyama | H04N 1/00893 358/1.13 |

FOREIGN PATENT DOCUMENTS

| JP | 2011211686 | 10/2011 |
| JP | 2015012383 | 1/2015 |

* cited by examiner

*Primary Examiner* — Miya J Williams
(74) *Attorney, Agent, or Firm* — JCIPRNET

(57) ABSTRACT

An image forming apparatus includes a first wireless communication unit that performs wireless communication based on a first wireless communication method, a second wireless communication unit that performs wireless communication based on a second wireless communication method different from the first wireless communication method, and a prioritized control unit that performs a control based on information related to a communication destination of the first wireless communication unit and information related to a communication destination of the second wireless communication unit such that one wireless communication unit of the first wireless communication unit or the second wireless communication unit is operated in a prioritized manner over another wireless communication unit.

4 Claims, 4 Drawing Sheets

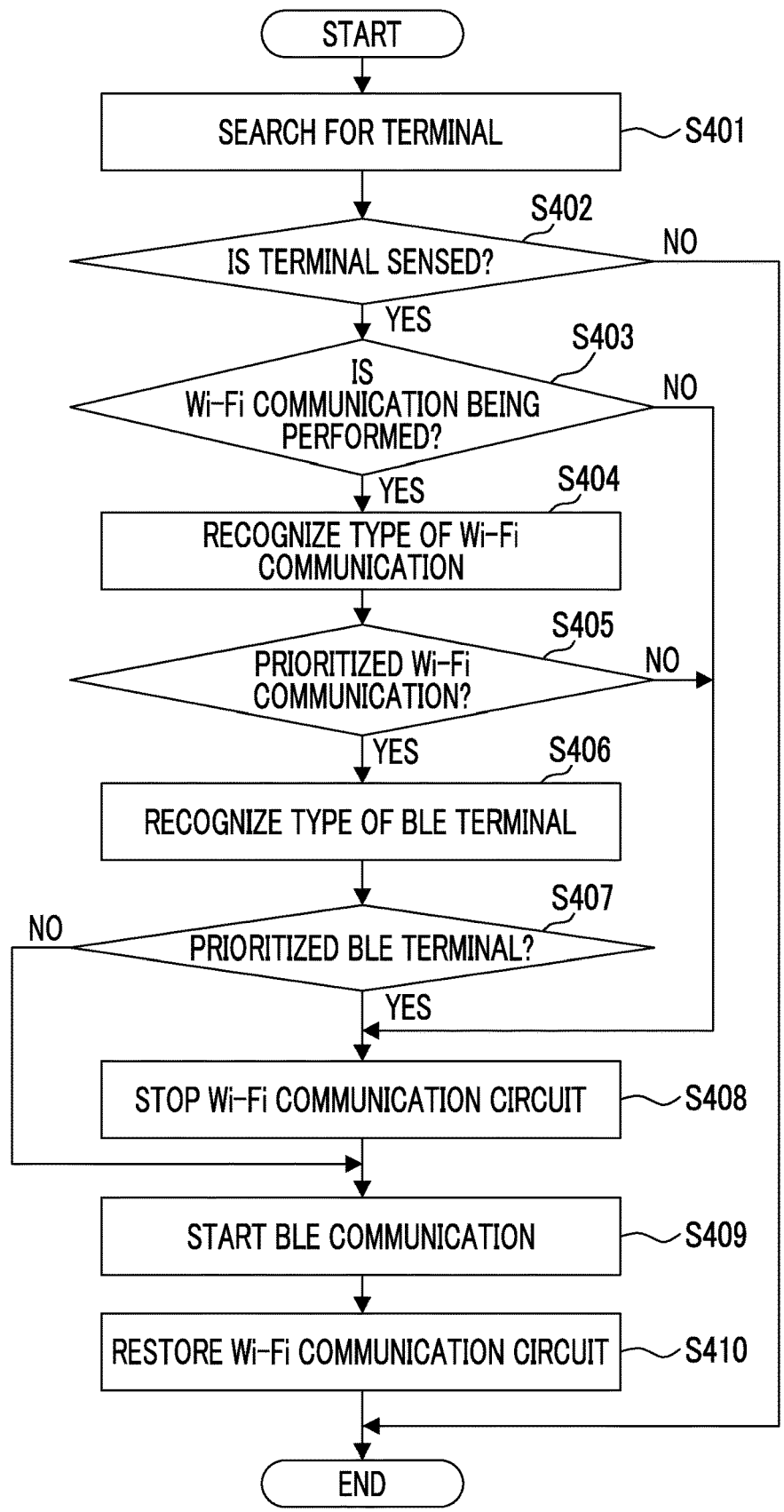

COMMUNICATION PRIORITY OF IMAGE FORMING APPARATUS AND NON-TRANSITORY COMPUTER READABLE MEDIUM STORING PROGRAM

CROSS-REFERENCE TO RELATED APPLICATIONS

This application is based on and claims priority under 35 U.S.C. 119 from Japanese Patent Application No. 2018-093849 filed May 15, 2018.

BACKGROUND

(i) Technical Field

The present invention relates to an image forming apparatus and a non-transitory computer readable medium storing a program.

(ii) Related Art

In a case where NFC communication with a smartphone is executed by bringing the smartphone in the vicinity during wireless LAN communication with a PC, a multifunction peripheral disclosed in JP2015-012383A transmits a stop signal to the smartphone using NFC communication until at least the wireless communication currently in execution with the PC is completed. In a case where the smartphone receives the stop signal from the multifunction peripheral, the smartphone stops wireless communication based on the wireless LAN until at least the reception of the stop signal stops.

A wireless communication apparatus disclosed in JP2011-211686A includes a first wireless communication unit performing wireless communication based on a first wireless communication method in a predetermined frequency bandwidth and a second wireless communication unit performing wireless communication based on a second wireless communication method in a predetermined frequency bandwidth. In a case where wireless communication based on the first wireless communication method is performed, and wireless communication based on the second wireless communication method is performed, a wireless communication system performs a control such that data for wireless communication based on the second wireless communication method is transmitted to the wireless communication apparatus through another wireless communication apparatus.

SUMMARY

In an image forming apparatus that includes plural wireless communication units, in a case where communication of one wireless communication unit is prioritized at all times over the other wireless communication units, communication using the other wireless communication units may be restricted even in a case where, for example, a user desires to communicate using another wireless communication unit that is not prioritized.

Aspects of non-limiting embodiments of the present disclosure relate to provision of an image forming apparatus that includes plural wireless communication units and enables a user to more securely execute communication desired to be prioritized than in a case where communication of one wireless communication unit is prioritized at all times over the other wireless communication units.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image forming apparatus including a first wireless communication unit that performs wireless communication based on a first wireless communication method, a second wireless communication unit that performs wireless communication based on a second wireless communication method different from the first wireless communication method, and a prioritized control unit that performs a control based on information related to a communication destination of the first wireless communication unit and information related to a communication destination of the second wireless communication unit such that one wireless communication unit of the first wireless communication unit or the second wireless communication unit is operated in a prioritized manner over another wireless communication unit.

BRIEF DESCRIPTION OF THE DRAWINGS

Exemplary embodiment(s) of the present invention will be described in detail based on the following figures, wherein:

FIG. 4 is a flowchart illustrating an operation example of the image forming apparatus.

DETAILED DESCRIPTION

Hereinafter, an exemplary embodiment of the present invention will be described with reference to the accompanying drawings.

Image Forming System 1

Figure 1:
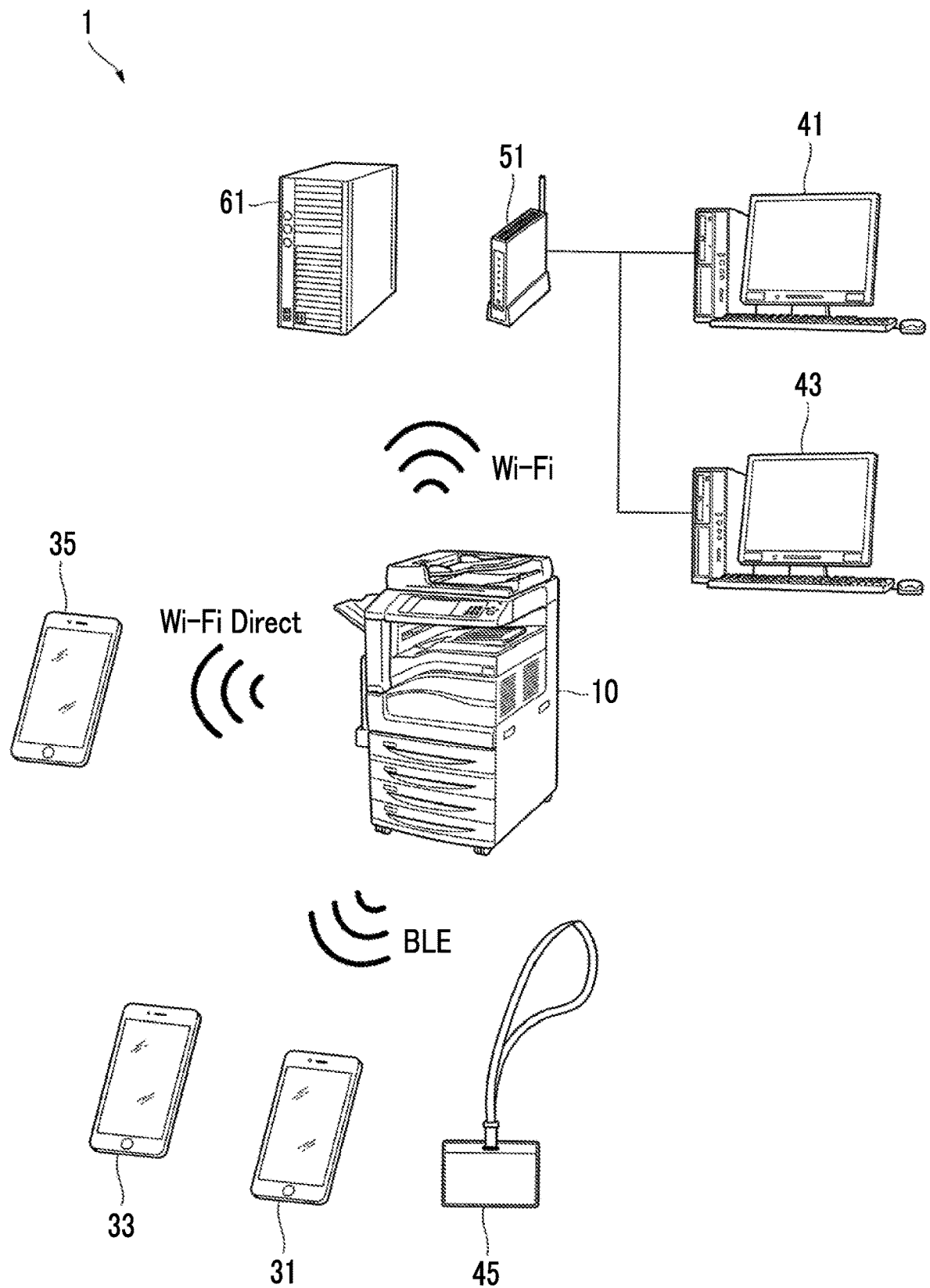
FIG. 1 is a diagram illustrating an overall configuration example of an image forming system to which the present exemplary embodiment is applied.

FIG. 1 is a diagram illustrating an overall configuration example of an image forming system 1 to which the present exemplary embodiment is applied.

The image forming system 1 includes an image forming apparatus 10, terminals 31, 33, 35, 41, 43, and 45, a relay device (access point) 51, and a server 61.

The image forming apparatus 10 has not only a function of forming an image on a sheet but also a scan function for reading an image on an original document, a facsimile communication function for performing facsimile transmission, and a wireless communication function for performing wireless communication with other apparatuses.

Each of the terminals 31, 33, 35, 41, 43, and 45 is configured with a computer apparatus or the like that may communicate with the image forming apparatus 10. Each of the terminals 31, 33, and 35 in the example illustrated in FIG. 1 is configured with a mobile terminal that is a portable computer apparatus such as a smartphone, a tablet computer, or a laptop computer which may communicate with the image forming apparatus 10. Each of the terminals 41 and 43 is configured with a desktop computer that may communicate with the image forming apparatus 10 through the relay device (access point) 51. The terminal 45 is a so-called wearable terminal that may communicate with the image forming apparatus 10 and may be worn by a user. More specifically, the terminal 45 illustrated in FIG. 1 is a name tag that is worn around the neck of a user or the like of the image forming apparatus 10. In the following description, the terminals 31, 33, 35, 41, 43, and 45 may be referred to as "terminals 31 and the like" in a case where the terminals 31, 33, 35, 41, 43, and 45 are not distinguished from each other.

The server 61 is configured with a computer apparatus that may communicate with the image forming apparatus 10 through a network.

The type or the number of terminals 31 and the like is not particularly limited, provided that the terminals 31 and the like may communicate with the image forming apparatus 10. The terminals 31 and the like may be perceived as one example of a so-called Internet of Things (IoT) device that is a device which has a unique IP address and may be connected to the Internet. In the example illustrated in FIG. 1, while the terminal 45 is described as a name tag that is a wearable terminal, the terminal 45 is not limited thereto. For example, the terminal 45 may be configured with a wristband, glasses, or the like, provided that the user may wear the terminal 45.

Next, the image forming apparatus 10 in the present exemplary embodiment has plural wireless communication functions. In other words, the image forming apparatus 10 may perform wireless communication with the terminals 31 and the like using plural communication protocols. The image forming apparatus 10 in the example illustrated in FIG. 1 may perform communication based on Bluetooth (registered trademark) and communication based on Wireless Fidelity (Wi-Fi; registered trademark). The image forming apparatus 10 in the example illustrated in FIG. 1 performs communication based on Bluetooth Low Energy (registered trademark) that is one of extension specifications of Bluetooth.

In the following description, communication based on Wi-Fi may be referred to as "Wi-Fi communication". Bluetooth Low Energy may be referred to as "BLE". Communication based on Bluetooth Low Energy may be referred to as "BLE communication".

The image forming apparatus 10 transmits and receives various data with the terminals 31 and the like using the plural wireless communication functions. For example, the image forming apparatus 10 transmits and receives so-called job data such as print data or scanner data with the terminals 41 and 43 that are desktop computers. Communication between the image forming apparatus 10 and the terminals 41 and 43 is performed through the relay device 51. The type of communication between the image forming apparatus 10 and the relay device 51 is Wi-Fi communication.

The image forming apparatus 10 transmits and receives the job data with the terminal 35 that is a mobile terminal. The type of communication between the image forming apparatus 10 and the terminal 35 in the example illustrated in FIG. 1 is communication based on Wi-Fi Direct (registered trademark). Wi-Fi Direct is a communication standard that enables the terminal 35 to directly perform Wi-Fi communication with the image forming apparatus 10 without passing through an access point (for example, the relay device 51) that is used in Wi-Fi communication.

For each preset period, the image forming apparatus 10 searches (scans) for the terminals 31, 33, and 45 positioned around the image forming apparatus 10 and transmits and receives data with the searched terminals 31, 33, and 45. The type of communication between the image forming apparatus 10 and the terminals 31, 33, and 45 in the example illustrated in FIG. 1 is BLE communication. The data that is transmitted and received with the terminals 31, 33, and 45 is, for example, information (sensor information) related to the terminals 31, 33, and 45. Specifically, in the case of the terminal 45 that is a wearable terminal, the sensor information is data (vicinity data) or the like that indicates that the user wearing the terminal 45 approaches the image forming apparatus 10. For example, using the vicinity data, the frequency of use of the image forming apparatus 10 by the user wearing the terminal 45 may be calculated. The vicinity data in the example may be perceived as data other than the job data.

The image forming apparatus 10 periodically uploads information collected by searching (BLE scan) for the terminals 31, 33, and 45 based on BLE communication to the server 61 on the network. At this point, the image forming apparatus 10 performs communication based on Wi-Fi communication. In the following description, communication for uploading the information collected by the BLE scan to the server 61 may be referred to as "cloud communication".

The image forming apparatus 10 may communicate with the server 61 using Wi-Fi communication in the case of an update of the settings of the image forming apparatus 10 such as a version update. In the following description, communication that is performed in a case where the image forming apparatus 10 updates its settings may be referred to as "setting update communication".

In recent years, a communication module (combo chip) that is configured by implementing plural wireless communication functions such as Wi-Fi and Bluetooth in one chip is used. In a case where such a combo chip is used, a decrease in device size or a reduction in manufacturing cost is expected. Meanwhile, in a case where such a combo chip is used, electric wave interference may occur particularly in a case where, for example, an antenna is shared between Wi-Fi and Bluetooth. In addition, executing Wi-Fi and Bluetooth communication at the same time may exert an excessive load or the like on the communication module.

In a case where communication based on Bluetooth is performed during communication based on Wi-Fi, an approach different from the present exemplary embodiment is considered such that Wi-Fi communication is stopped, and data that is transmitted using the stopped Wi-Fi communication is temporarily detoured to another image forming apparatus. However, in such an approach, a special configuration for stopping Wi-Fi communication and executing the detour or the like is needed. In addition, in a case where Wi-Fi communication is desired to be prioritized, detoured Wi-Fi communication may cause a delay in Wi-Fi communication. Furthermore, for example, in a case where Wi-Fi communication is prioritized in the communication module for Wi-Fi and Bluetooth, data (for example, data acquired from an IoT terminal, that is, transient IoT data) that is acquired through communication based on Bluetooth may not be collected. That is, data acquisition using communication that is desired to be prioritized by the user may be failed.

Meanwhile, in the image forming apparatus 10 in the present exemplary embodiment, communication to be prioritized is switched using information related to the communication destination of Wi-Fi communication and information related to the communication destination of BLE communication. By doing so, failure of data acquisition using communication that is desired to be prioritized by the user may be reduced. Hereinafter, a specific configuration of the image forming apparatus 10 in the present exemplary embodiment will be described.

Hardware Configuration of Image Forming Apparatus 10

Figure 2:
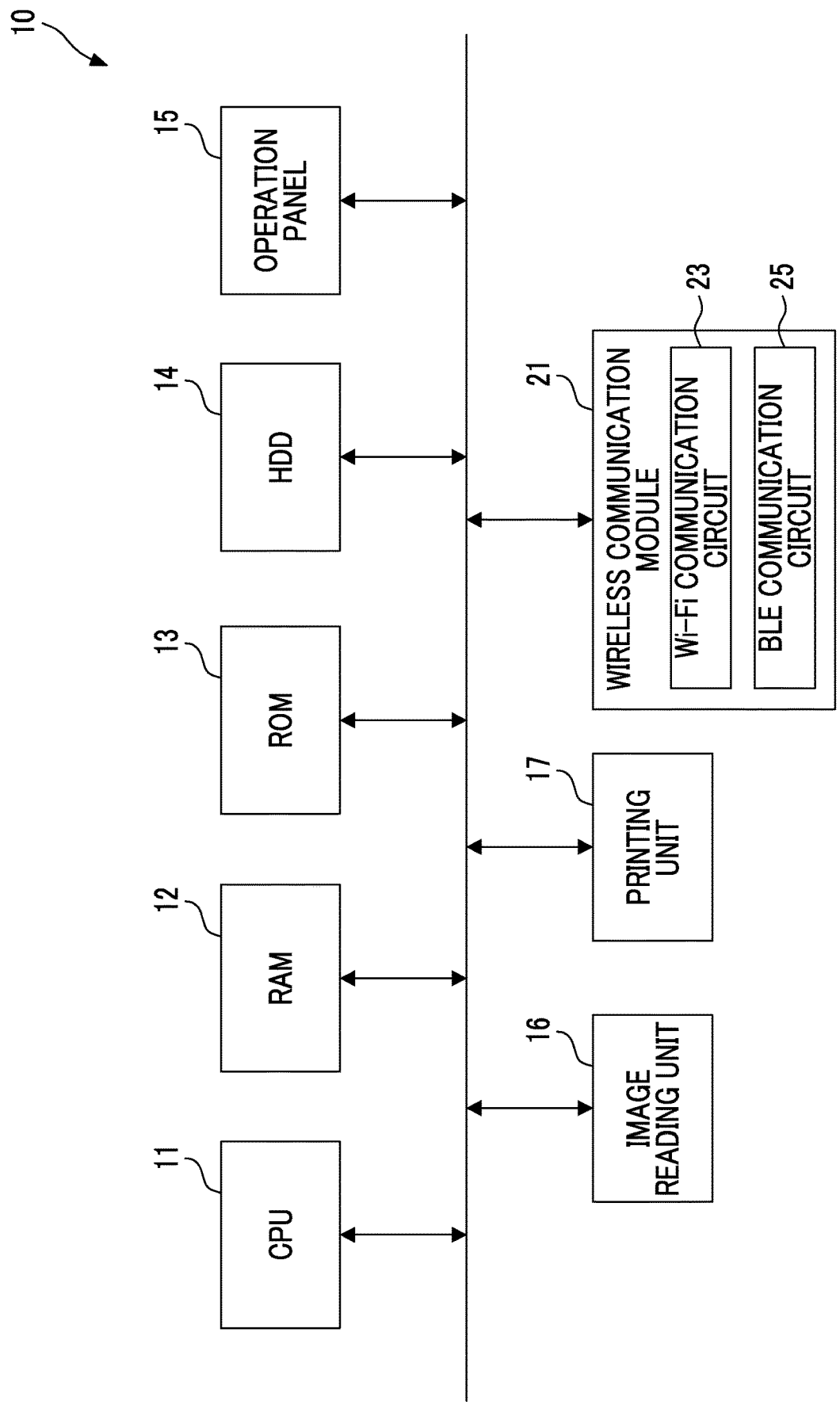
FIG. 2 is a diagram illustrating a hardware configuration example of an image forming apparatus.

FIG. 2 is a diagram illustrating a hardware configuration example of the image forming apparatus 10.

As illustrated in FIG. 2, the image forming apparatus 10 includes a CPU 11, a random access memory (RAM) 12, a read only memory (ROM) 13, a hard disk drive (HDD) 14, an operation panel 15, an image reading unit 16, a printing unit 17, and a wireless communication module 21.

The CPU 11 implements various functions of the image forming apparatus 10 by loading various programs stored in the ROM 13 or the like into the RAM 12 and executing the programs.

The RAM 12 is a memory that is used as a work memory or the like of the CPU 11.

The ROM 13 is a memory that stores various programs and the like executed by the CPU 11.

The HDD 14 is, for example, a magnetic disk device that stores image data (scanner data) read by the image reading unit 16, image data (print data) used in image forming by the printing unit 17, and the like.

The operation panel 15 is, for example, a touch panel that displays various kinds of information and receives an operation input from the user.

The image reading unit 16 reads an image that is recorded on an original document. The image reading unit 16 is, for example, a scanner and may use a CCD method in which reflective light with respect to light radiated to the original document from a light source is condensed using a lens and is received using charge coupled devices (CCD), or a CIS method in which reflective light acquired by radiating light to the original document from an LED light source is received using a contact image sensor (CIS).

The printing unit 17 forms an image on a sheet. The printing unit 17 is, for example, a printer and may use an electrophotographic method in which the image is formed by transferring toner attached to a photosensitive body to the sheet, or an inkjet method in which the image is formed by discharging ink onto the sheet.

The wireless communication module 21 performs wireless communication with the terminals 31 and the like. The wireless communication module 21 includes a Wi-Fi communication circuit 23 performing Wi-Fi communication and a BLE communication circuit 25 performing BLE communication. The wireless communication module 21 in the example illustrated in FIG. 2 functions as a combo chip configured by implementing the function of Wi-Fi communication and the function of BLE communication in one chip. The Wi-Fi communication circuit 23 is one example of a first wireless communication unit, and the BLE communication circuit 25 is one example of a second wireless communication unit.

The programs executed by the CPU 11 may be provided to the image forming apparatus 10 in a state where the programs are stored in a computer readable recording medium such as a magnetic recording medium (a magnetic tape, a magnetic disk, or the like), an optical recording medium (an optical disc or the like), a magneto-optical recording medium, or a semiconductor memory. The programs executed by the CPU 11 may be downloaded to the image forming apparatus 10 from, for example, the server 61 (refer to FIG. 1) on the network.

The image forming apparatus 10 illustrated in FIG. 2 may execute accumulated printing. The accumulated printing is a printing process that is not immediately performed in a case where the print data is received. The print data is temporarily stored in the HDD 14 or the like, and the printing process is executed by receiving a printing instruction afterward.

Configuration Example of Image Forming Apparatus 10

Figure 3:
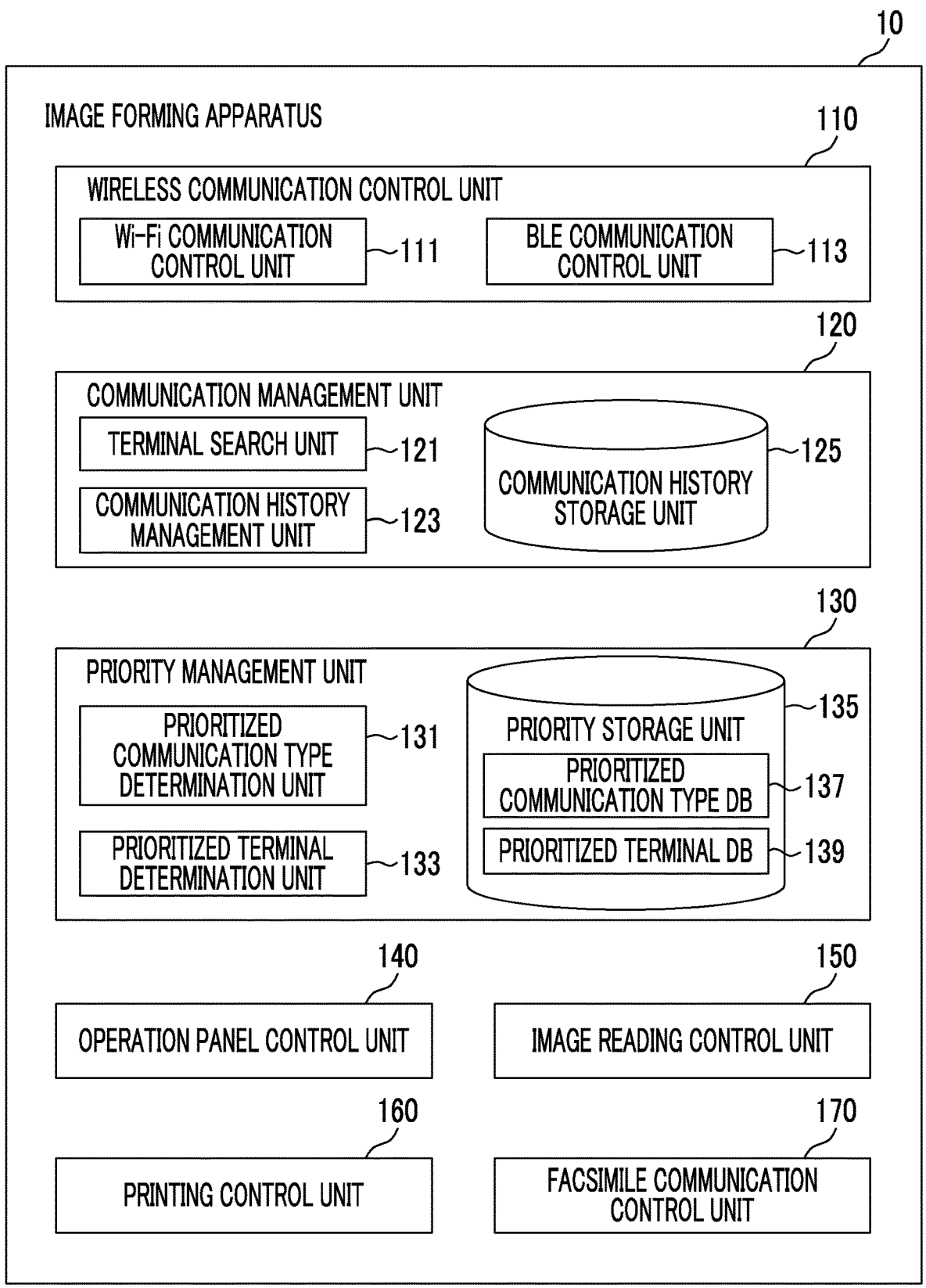
FIG. 3 is a diagram for describing a configuration example of the image forming apparatus.

FIG. 3 is a diagram for describing a configuration example of the image forming apparatus 10.

Next, a configuration example of the image forming apparatus 10 will be described with reference to FIG. 1 to FIG. 3.

The image forming apparatus 10 of the present exemplary embodiment includes a wireless communication control unit 110, a communication management unit 120, a priority management unit 130, an operation panel control unit 140, an image reading control unit 150, a printing control unit 160, and a facsimile communication control unit 170.

The wireless communication control unit 110 controls the wireless communication module 21. Specifically, the wireless communication control unit 110 transmits and receives data with the terminals 31 and the like through the wireless communication module 21. The wireless communication control unit 110 illustrated in FIG. 3 includes a Wi-Fi communication control unit 111 controlling the operation of the Wi-Fi communication circuit 23 and a BLE communication control unit 113 controlling the BLE communication circuit 25. The wireless communication control unit 110 determines the operation timings of the Wi-Fi communication circuit 23 and the BLE communication circuit 25 in the wireless communication module 21, that is, determines switching of each of the Wi-Fi communication circuit 23 and the BLE communication circuit 25 between an ON state and an OFF state.

The communication management unit 120 determines whether or not each of the Wi-Fi communication circuit 23 and the BLE communication circuit 25 is in operation (in data communication). The communication management unit 120 manages the type of data communication being performed in each of Wi-Fi communication and BLE communication. For example, various communication applications that operate in the terminals 31 and the like notify the start of data communication and the type of data when starting data communication. In addition, various communication applications notify the end of data communication after finishing data communication. Based on the notifications from the communication applications, the communication management unit 120 determines whether or not the Wi-Fi communication circuit 23 and the BLE communication circuit 25 are in operation, or manages the type of data communication being performed. Examples of data communication by various communication applications include communication of the job data, the cloud communication, the setting update communication, and the like.

The communication management unit 120 illustrated in FIG. 3 includes a terminal search unit 121, a communication history management unit 123, and a communication history storage unit 125. The terminal search unit 121 executes the BLE scan through the BLE communication control unit 113 and detects a target terminal (for example, the terminal 45) to communicate with. The terminal search unit 121 measures the physical distance from the target terminal to the image forming apparatus 10 using BLE communication. The communication history management unit 123 manages the history of communication (communication history) executed by the image forming apparatus 10. The communication history storage unit 125 stores the communication history (IoT data communication history) managed by the communication history management unit 123. More specifically, the communication history storage unit 125 stores identification information related to a communication counterpart (IoT terminal) as the communication history.

The priority management unit 130 manages switching of the Wi-Fi communication circuit 23 and the BLE communication circuit 25 performed by the wireless communication control unit 110 between the ON state and the OFF state in accordance with a preset wireless communication priority order. The wireless communication priority order may be freely set by the user. As will be described in detail below, the wireless communication priority order in the example illustrated in FIG. 3 is set using the type of communication, the type of terminal, and the like. The priority management unit 130 is one example of a prioritized control unit. The type of communication, the type of terminal, and the like are one example of information related to the communication destination of the image forming apparatus 10. More specifically, the information related to the communication destination of the image forming apparatus 10 includes information related to communication with the communication destination and information related to the communication destination.

The priority management unit 130 illustrated in FIG. 3 includes a prioritized communication type determination unit 131, a prioritized terminal determination unit 133, and a priority storage unit 135. The prioritized communication type determination unit 131 determines whether or not communication to be executed is of a type of communication to be prioritized. The prioritized terminal determination unit 133 determines whether or not the communication counterpart of communication to be executed is a terminal to be prioritized. The priority storage unit 135 stores a prioritized communication type DB 137 for setting the type of communication to be prioritized and a prioritized terminal DB 139 for setting the terminal to be prioritized. The prioritized communication type determination unit 131 determines the type of communication to be prioritized in accordance with the prioritized communication type DB 137. The prioritized terminal determination unit 133 determines the terminal to be prioritized in accordance with the prioritized terminal DB 139.

The prioritized communication type DB 137 in the example illustrated in FIG. 3 is set using the type of wireless communication method and the type of communication data. Specifically, the prioritized communication type DB 137 is set such that BLE communication is prioritized over Wi-Fi communication. The prioritized communication type DB 137 is set such that data communication that requires a real time property (instantaneousness) is prioritized over data communication that does not need the real time property. The prioritized communication type determination unit 131 determines the type of communication to be prioritized in accordance with the prioritized communication type DB 137.

Whether or not the real time property is required is set in advance by the user. For example, data communication that requires the real time property is communication of the job data such as typical print data or data communication based on Wi-Fi Direct. Communication based on Wi-Fi Direct mostly requires the real time property because the process of connecting to the image forming apparatus 10 or instructing the image forming apparatus 10 to execute printing is performed by the communication counterpart in front of the image forming apparatus 10, that is, in the vicinity of the image forming apparatus 10. Communication that does not need the real time property includes, for example, the setting update communication and print data communication in the accumulated printing. The real time property may be perceived as the degree of urgency of data communication. For example, by prioritizing typical print data communication, for example, a delay in printing operation performed by the image forming apparatus 10 is reduced.

The prioritized terminal DB 139 in the example illustrated in FIG. 3 is set using the attributes of a terminal, specifically, the type of terminal, the position of the terminal, and the like. Specifically, for the terminal to be prioritized (prioritized terminal), the prioritized terminal DB 139 stores the address or the device name of the prioritized terminal in advance. The prioritized terminal determination unit 133 determines the terminal to be prioritized in accordance with the terminal stored in the prioritized terminal DB 139.

The prioritized terminal determination unit 133 determines that a terminal that is present in a short range from the image forming apparatus 10 is the prioritized terminal. For example, the prioritized terminal determination unit 133 determines that a terminal of which the distance measured by the BLE communication control unit 113 is less (shorter) than a preset value is the prioritized terminal. The prioritized terminal determination unit 133 determines that a new terminal that is not included in the history of the communication history storage unit 125 is the prioritized terminal. Such a new terminal is regarded as a (non-collected) terminal from which the IoT data is not collected, and communication with such a terminal is prioritized over communication with a terminal (non-prioritized terminal) other than the prioritized terminal.

The priority management unit 130 in the example illustrated in FIG. 3 sets the priority order (priority) of each type of wireless communication as follows. First, wireless communication that is to be most prioritized, that is, the first order wireless communication, is BLE communication with the prioritized terminal (BLE prioritized communication). The second order wireless communication is Wi-Fi communication of the job data that requires the real time property (Wi-Fi real time communication). The third order wireless communication is BLE communication with the non-prioritized terminal (BLE non-prioritized communication). The fourth order wireless communication is Wi-Fi communication of data that does not require the real time property (Wi-Fi non real time communication). In the example illustrated in FIG. 3, BLE communication is prioritized over Wi-Fi communication, and data communication that requires the real time property is prioritized over data communication that does not require the real time property.

Returning to the description of the configuration of the image forming apparatus 10 illustrated in FIG. 3, the operation panel control unit 140 controls the operation panel 15. The operation panel control unit 140 receives an instruction to set the type of communication to be prioritized (communication type priority), the terminal to be prioritized (prioritized terminal), and the like from the user through the operation panel 15.

The image reading control unit 150 controls the image reading unit 16.

The printing control unit 160 controls the printing unit 17.

The facsimile communication control unit 170 controls the image reading unit 16 and the printing unit 17 and executes facsimile communication.

Operation Example of Image Forming Apparatus 10

FIG. 4 is a flowchart illustrating an operation example of the image forming apparatus 10.

Next, an operation example of the image forming apparatus 10 will be described with reference to FIG. 1 to FIG. 4.

First, the terminal search unit 121 of the image forming apparatus 10 searches for a terminal by performing the BLE scan (S401). The terminal search unit 121 determines whether or not a terminal arranged around the image forming apparatus 10 is sensed (S402). In a case where a terminal is detected (YES in S402), the communication management unit 120 determines whether or not the Wi-Fi communication circuit 23 is executing Wi-Fi communication (S403).

In a case where the Wi-Fi communication circuit 23 is executing Wi-Fi communication (YES in S403), the priority management unit 130 recognizes the communication type of Wi-Fi communication in execution (S404). The priority management unit 130 determines whether or not the type of Wi-Fi communication in execution is communication to be prioritized (S405). In a case where the type of Wi-Fi communication in execution is communication to be prioritized (YES in S405), the priority management unit 130 recognizes the type of the terminal (refer to S402) detected by the BLE scan, the position of the terminal, and the like (S406). The priority management unit 130 determines whether or not the terminal detected by the BLE scan is the prioritized terminal (S407). In the case of the prioritized terminal (YES in S407), the priority management unit 130 stops the Wi-Fi communication circuit 23 (S408). That is, Wi-Fi communication is temporarily stopped.

Next, the priority management unit 130 starts data communication (BLE communication) using the BLE communication circuit 25 (S409). After the end of BLE communication, the Wi-Fi communication circuit 23 is restored in a case where the Wi-Fi communication circuit 23 is stopped (S410).

In a case where the Wi-Fi communication circuit 23 is not performing data communication (NO in S403), or in a case where the type of Wi-Fi communication is not communication to be prioritized (NO in S405), the priority management unit 130 stops the Wi-Fi communication circuit 23 (S408). The priority management unit 130 starts BLE communication using the BLE communication circuit 25 (S409).

In a case where the terminal (refer to S402) detected by the BLE scan is not the prioritized terminal (NO in S407), the priority management unit 130 starts BLE communication using the BLE communication circuit 25 without stopping the Wi-Fi communication circuit 23 (S409).

In a case where a terminal is not sensed by the BLE scan (NO in S402), the communication management unit 120 finishes the process.

In the example illustrated in FIG. 4, for example, as described above, in a case where the terminal (refer to S402) detected by the BLE scan is the prioritized terminal, the Wi-Fi communication circuit 23 is stopped (S408). In a case where the terminal is not the prioritized terminal (NO in S407), the Wi-Fi communication circuit 23 is not stopped. That is, based on the terminal (refer to S402) detected by the BLE scan, any of Wi-Fi communication or BLE communication that is to be prioritized is switched, and failure of data acquisition in communication that is desired to be prioritized by the user may be reduced.

MODIFICATION EXAMPLES

Next, modification examples of the exemplary embodiment described in FIG. 1 to FIG. 4 will be described.

In the above description, the image forming apparatus has two wireless communication functions of Wi-Fi communication and BLE communication. However, the image forming apparatus 10 may have three or more wireless communication functions. Specifically, existing communication methods such as ZigBee (registered trademark) and Ultra Wideband (UWB) other than Wi-Fi communication or BLE communication may be used. Any of the three or more wireless communication functions that is to be prioritized may be switched in accordance with the preset wireless communication priority order.

In the above description, while the wireless communication module 21 is configured as a combo chip in which the functions of Wi-Fi communication and BLE communication are implemented in one chip, the present invention is not limited thereto. For example, the wireless communication functions of Wi-Fi communication and BLE communication may be implemented in separate chips.

In the above description, while data communication that requires the real time property is communication of the job data such as the print data or the scanner data, the present invention is not limited thereto. For example, facsimile communication may be set as data communication that requires the real time property. More specifically, facsimile communication (for example, IP FAX) may be prioritized in a case where, for example, the user of the image forming apparatus 10 has a reason to do so for task purposes.

In the above description, while BLE communication is prioritized over Wi-Fi communication, the present invention is not limited thereto. A configuration that is opposite to the above description, that is, a configuration in which Wi-Fi communication is prioritized over BLE communication, may be used.

In the above description, the physical distance from the target terminal to the image forming apparatus 10 is acquired using BLE communication. However, the physical distance from the target terminal to the image forming apparatus 10 may be acquired using Wi-Fi communication. In addition, communication with a terminal to be prioritized may be set depending on the physical distance from the target terminal to the image forming apparatus 10. For example, communication with the target terminal that is the closest to the image forming apparatus 10 may be prioritized.

In the above description, while the priority management unit 130 stops the Wi-Fi communication circuit 23 (S408) in a case where the terminal detected by the BLE scan is the prioritized terminal (YES in S407), the present invention is not limited thereto. For example, in a case where the terminal detected by the BLE scan is the prioritized terminal, BLE communication may be started using the BLE communication circuit 25 without stopping the Wi-Fi communication circuit 23 (S409).

In the above description, while the priority management unit 130 starts BLE communication without stopping the Wi-Fi communication circuit 23 (S409) in a case where the terminal detected by the BLE scan is not the prioritized terminal (NO in S407), the present invention is not limited thereto. For example, the BLE communication circuit may be restored after the Wi-Fi communication circuit 23 is stopped (S410).

In a case where BLE communication is executed without stopping the Wi-Fi communication circuit 23, there is a possibility that Wi-Fi communication may be unintentionally started. In addition, in such a case, electric wave interference between Wi-Fi communication and BLE communication may occur. More specifically, in a case where the duration of BLE communication is extended, for example, in a case where plural terminals are detected by the BLE scan, Wi-Fi communication is unintentionally started. Consequently, the possibility of electric wave interference is increased. Therefore, in a case where a preset condition is satisfied, for example, in a case where plural terminals are detected by the BLE scan, a control may be performed such that BLE communication is started after the Wi-Fi communication circuit 23 is stopped.

While the exemplary embodiment and various modification examples are described above, the exemplary embodiment and the modification examples may be combined with each other.

The present disclosure is not limited to the exemplary embodiment and may be embodied in various forms without departing from the nature of the present disclosure.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
a first wireless communication unit, comprising a circuit, that performs wireless communication based on a first wireless communication method;
a second wireless communication unit, comprising a circuit that performs wireless communication based on a second wireless communication method different from the first wireless communication method; and
a processor configured to function as a prioritized control unit that performs a control based on information related to a communication destination of the first wireless communication unit and information related to a communication destination of the second wireless communication unit such that one wireless communication unit of the first wireless communication unit or the second wireless communication unit is operated in a prioritized manner over another wireless communication unit,
wherein the prioritized control unit operates the one wireless communication unit in a prioritized manner based on an attribute of the communication destination of the first wireless communication unit and an attribute of the communication destination of the second wireless communication unit,
wherein the attribute is a history of communication executed by the image forming apparatus that is performed in a preset period, and
in a case where the image forming apparatus has the history of communication with one of the communication destination of the first wireless communication unit or the communication destination of the second wireless communication unit, and the image forming apparatus does not have the history of communication with an other of the communication destination of the first wireless communication unit or the communication destination of the second wireless communication unit, the other of the first wireless communication unit or the second wireless communication unit not having the history of communication is operated in a prioritized manner as the one wireless communication unit.

2. An image forming apparatus comprising:
a first wireless communication unit, comprising a circuit, that performs wireless communication based on a first wireless communication method;
a second wireless communication unit, comprising a circuit, that performs wireless communication based on a second wireless communication method different from the first wireless communication method; and
a processor configured to function as a prioritized control unit that performs a control based on information related to a communication destination of the first wireless communication unit and information related to a communication destination of the second wireless communication unit such that one wireless communication unit of the first wireless communication unit or the second wireless communication unit is operated in a prioritized manner over another wireless communication unit,
wherein the processor is further configured to function as an acquiring unit that acquires a distance to at least one of the communication destination of the first wireless communication unit or the communication destination of the second wireless communication unit, and
the one wireless communication unit is operated in a prioritized manner depending on the distance acquired by the acquiring unit.

3. The image forming apparatus according to claim 2,
wherein the acquiring unit acquires a distance to each of a plurality of communication destinations, and a wireless communication unit for a communication destination having the smallest distance among the plurality of acquired distances is operated in a prioritized manner as the one wireless communication unit.

4. A non-transitory computer readable medium storing a program causing a computer to implement:
a function of performing wireless communication based on a first wireless communication method;
a function of performing wireless communication based on a second wireless communication method different from the first wireless communication method; and
a function of performing a control based on information related to a communication destination of wireless communication based on the first wireless communication method and information related to a communication destination of wireless communication based on the second wireless communication method such that one wireless communication method of the first wireless communication method or the second wireless communication method is operated in a prioritized manner over another wireless communication method,
a function of operating the first wireless communication method in a prioritized manner based on an attribute of the communication destination of the first wireless communication method and an attribute of the communication destination of the second wireless communication method,
wherein the attribute is a history of communication executed by the computer that is performed in a preset period, and
in a case where the computer has the history of communication with one of the communication destination of the first wireless communication method or the communication destination of the second wireless communication method, and the computer does not have the history of communication with an other of the communication destination of the first wireless communication method or the communication destination of the second wireless communication method, the other of the first wireless communication method or the second wireless communication method not having the history of communication is operated in a prioritized manner as the one wireless communication method.

* * * * *